Patented Oct. 6, 1931

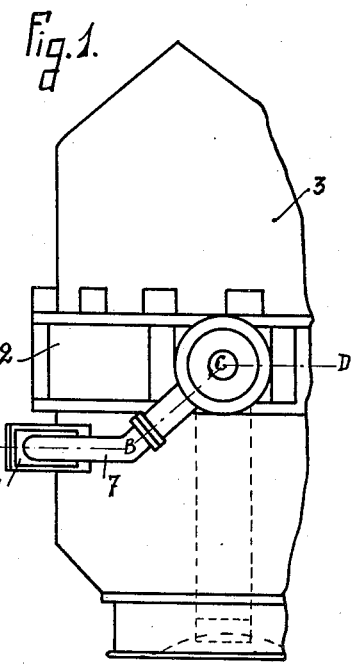
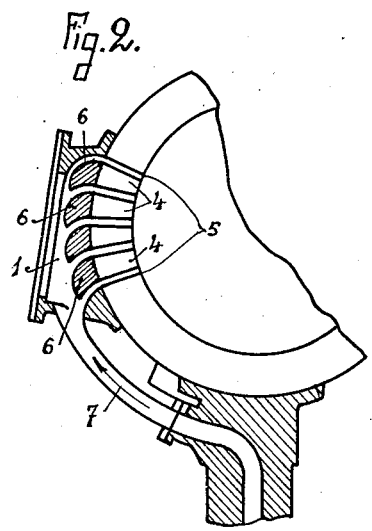

1,826,497

UNITED STATES PATENT OFFICE

FRANCOIS BICHEROUX, OF LIEGE, BELGIUM

PROCESS FOR DEPHOSPHORIZING IRON IN THE CONVERTER AND MEANS FOR CARRYING OUT SAID PROCESS

Application filed April 4, 1929, Serial No. 352,557, and in Belgium April 26, 1928.

The treatment by the Thomas or basic Bessemer process of a cast-iron of average composition: 0.6% silicon, 1% manganese and 1.7% phosphorus, requires in theory an addition of 85 kgs. of lime per metric ton in order to give a slag (7% silica, 7% oxide of manganese, 21% phosphorus pentoxide, 14% ferrousoxide, 51% of calcium and/or magnesium oxide) fusible at the temperature at the end of the operations.

In practice the addition amounts to about 125 kgs. of lime per ton.

Of the 40 kgs. or so thus lost, 25 kgs. have been carried off by the blast at the raising of the converter; 15 kgs. remain unmelted in the slag.

The operation involves a loss of iron, partly in the slag and partly carried off in the gases, three times as great as that which takes place in the acid Bessemer process.

At the beginning of the after-blow, the gases do not carry off any iron and the slag contains less than 3% ferrous oxide (FeO). The greater part of the loss mentioned results therefore from the unfavourable conditions in which the dephosphorizing is effected.

The pig iron used must contain about 1% manganese, not because the blast-furnace cannot desulphurize it without this costly addition, but because oxide of manganese is necessary for fixing the silica which is formed at the beginning of the operation.

As soon as the lime is in a state to replace the manganous oxide, the purpose of the manganese is achieved. The portion of it which remains in the molten iron is to say the least useless, and the remainder which passes into the slag is objectionable, in the same way as ferrous oxide, in the use of the slag as manure.

The operation has no characteristic end. It is terminated by guess-work, and in practice by a continuation of after-blow which aggravates the loss.

All these drawbacks arise from a single cause, viz. the addition of the lime, at the beginning, in a cold condition and in more or less powdery lumps; this added lime takes up heat slowly until at the beginning of the after-blow more than half of the lime has not yet attained the degree of heat and the stage of extreme subdivision which would allow it to combine immediately and indissolubly with the phosphoric acid which tends to be formed.

At the moderate temperatures of a refining furnace, the order of elimination of the impurities from pig iron is:—silicon, manganese, phosphorus and carbon.

In the puddling furnace, an iron of good quality is dephosphorized before the end of the frothing or boiling.

In the basic Martin furnace, a sufficient addition of peroxide produces the same result.

In the Bell-Krupp process, the treatment of a liquid iron with a mixture of peroxide and limestone fritted together and highly heated upon the hearth of a Siemens regenerative furnace, expels 95% of the silicon and 80% of the phosphorus from the iron, before the carbon enters into reaction.

In the Thomas converter, even a relatively hot iron of low silicon content loses up to two-fifths of its phosphorus during the decarburizing and before the after-blow.

If then, this being the characteristic of the dephosphorizing process to which the present invention relates, the lime is introduced into the converter, at a suitable time, in a continuous manner and in a state such that it takes up at once the temperature of the surrounding medium, and is therefore ready to react without delay upon the phosphoric acid which tends to be formed, the latter as it is formed, will combine with the lime and remain in the slag in solution in the initial silicates, because the conditions of a satisfactory reaction are realized and maintained, the weight of the added lime increasing according to the formation of the acid and in the desired proportion.

Consequently, if, in the decarburizing period, during which the frothing or boiling mass occupies more than two-thirds of the internal volume of the converter, in the form of an emulsion of relatively low density and of enormous contact area, the lime is injected into the converter in powdered form and in a continuous manner, this lime will take up almost instantaneously the temperature of the surrounding medium, will stick to the foaming mass which it has to traverse and will combine with the phosphoric acid, without any possibility of inverse reaction.

The bath will be dephosphorized before the end of the decarburation, the evolution of gas in the latter being precisely the mechanical agent which provides for the increase of the contact areas.

There will therefore be no longer necessity for the after-blow.

The operation may be carried out as follows:—

After addition of the ferro-maganese, the slag which the customary raking out does not remove is maintained in the converter, being solidified by throwing in 200 to 300 kgs. of lime in lumps.

The steel being transferred to the ladle and the pig iron charged, the converter is raised.

The remaining slag and its excess charge of lime serve to form a liquid slag from the very beginning, which renders manganese unnecessary in the iron, fixes the silica of initial formation and constitutes the flux necessary for the phosphate of subsequent formation.

As soon as the operation is under way, that is to say, when the decarburizing emulsifies the bath, the lime is injected in powder, in a continuous manner and with a progressively increasing supply in such a way that the whole addition is completed two or three minutes before the end of the decarburizing.

The disappearance of the flame marks the end of the operation, as in the acid Bessemer process.

By this method of procedure:

(a) The waste of lime will be almost suppressed.

(b) The loss of iron, which results almost exclusively from the after-blow, will be reduced by two-thirds.

(c) The manganese content of the pig iron can be greatly reduced.

(d) A substantial desulphurizing is to be expected from the fact that the slag being constantly liquid is always maintained in a condition to decompose the iron sulphide by its excess of lime.

(e) The slag being of less weight, will be at the same time richer in acid and poorer in harmful metallic oxides.

(f) The operation will be shorter and will yield a purer and more uniform steel.

(g) Phosphorus being no longer the calorific element indispensable to the satisfactory completion of the operations its limits of content in the pig iron can be considerably extended.

Thus a medium-quality foundry iron having 1.25% silicon, 0.9% phosphorus and 0.5% manganese, will give with an addition of 60 kgs. of lime per metric ton, a molten iron accompanied by 125 kgs. of slag containing 21% silica, 16% phosphorus pentoxide, 11% manganese and iron oxides and 52% lime, more fusible than the slag of the ordinary Thomas process and therefore of higher purification capacity.

For the practical introduction of the powdered lime into the converters there may be used the means or devices shown on the accompanying drawings, these being arranged so that the transfer of the lime in the form of powder carried along by the air of the blast, or by an inert gas, suffers no obstruction and that its distribution can be controlled at will.

In the drawings:—

Figure 1 represents an external partial view of a converter provided with a device allowing of carrying out the process according to the present invention.

Figure 2 is a section taken along A B C D of Figure 1.

Referring to the drawings, a blast chamber 1 is fixed below the belt 2 of the converter 3, at a sufficient distance from the bottom not to be reached by the boiling up of the mass at the beginning of the blowing.

On the inner side of this chamber 1, there is arranged a wall 5 having tuyères afforded by one or more rectangular bricks 4 made of dolomite or any other neutral material, pressed and baked, upon the life of which will depend the necessity of having the said wall fixed or removable.

To this wall 5 is secured a metal plate having a cross section or profile resembling saw-teeth as at 6, the function of which is to divide up the current of lime laden gas brought through the pipe 7 at the level of the tuyères and to allow none of it to stagnate in the chamber 1.

The construction illustrated is to be provided with a compressor of inert gas or air, a lime grinder and a distributor with adjustable output, operating under pressure and without loss, these being placed at a suitable point beyond the reach of the converter.

What I claim is:—

A process for dephosphorizing iron in the converter by the use of pulverized lime blown in during the decarburizing stage, characterized by the fact that an initial slag is formed by the residual slag of the preceding operation and intentionally retained in the converter; and that, after the fixation of silica by said initial slag, the pulverized lime is injected continuously up to the first signs of the end of the decarburizing stage.

In testimony whereof, I have signed my name to this specification at Brussels, Belgium, this 20th day of March, 1929.

FRANCOIS BICHEROUX.